UNITED STATES PATENT OFFICE.

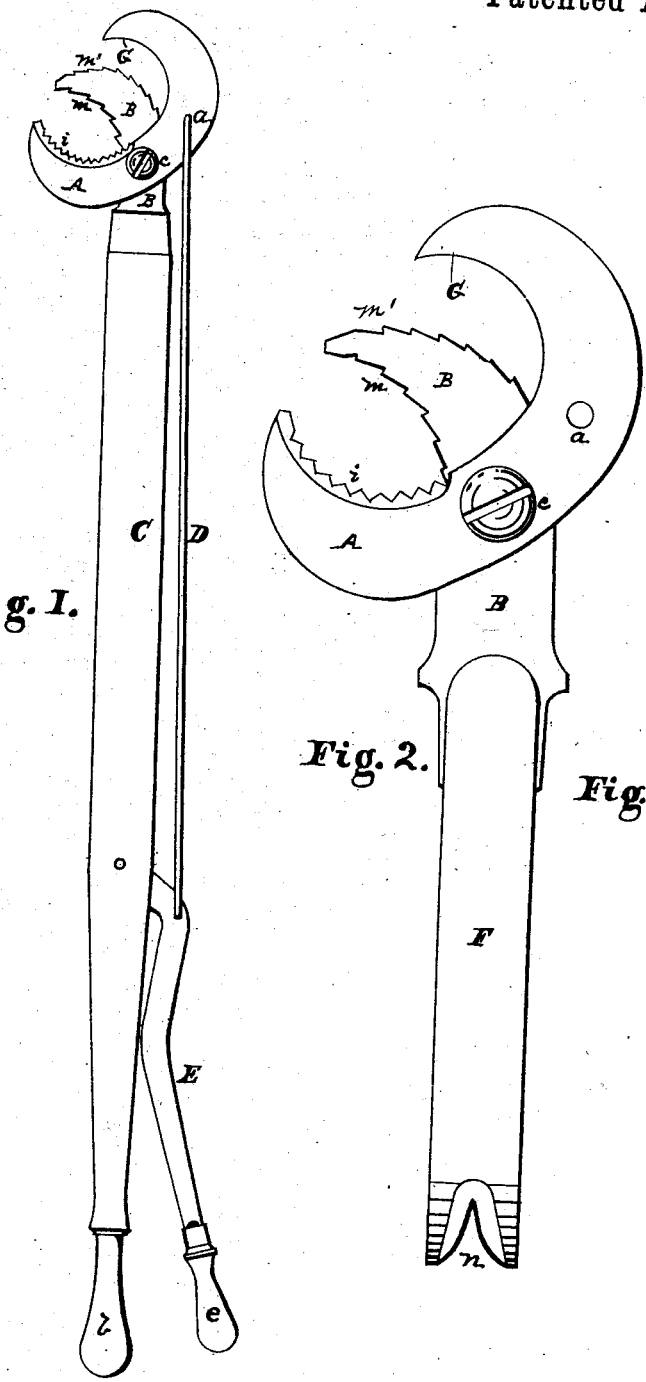

GEORGE W. BISHOP, OF STERLING TOWNSHIP, BROWN COUNTY, ASSIGNOR OF ONE-HALF TO DANIEL W. ATCHLEY AND ELKANAH B. HOLMES, OF WILLIAMSBURG, OHIO.

COMBINATION-TOOL.

SPECIFICATION forming part of Letters Patent No. 245,122, dated August 2, 1881.

Application filed April 25, 1881. (No model.)

*To all whom it may concern:*

Be it known that I, GEORGE W. BISHOP, of Sterling Township, Brown county, Ohio, have invented a new and useful Combination-Tool, especially adapted to the use of agriculturists, of which the following is a specification.

The invention consists of an improved tobacco girdling or deadening instrument, convertible into a wrench for turning nuts, round bolts, pipes, &c.

In the accompanying drawings, Figure 1 is a view of the instrument attached to a long handle, with a hand-lever for operating the jaw which is used in the girdling process. Fig. 2 is a view of the tool detached from the pole or handle, so as to be useful as a wrench. Fig. 3 is a sectional top view, showing the manner of pivoting the movable jaw.

Like letters of reference refer to like parts.

B is a stationary jaw removably attached to the upper end of a rod, C, which has a handle, b, at its lower end. The jaw B is curved, as shown, and has serrations m and m' upon its lower concave and upper convex side respectively.

A is a forked lever or jaw, curved as shown, and adapted to straddle the jaw B, to which it is pivoted by a bolt, c. The forked end of jaw A is provided with serrations i, and the opposite end is formed into a hook, G.

E is a hand-lever, pivoted to the rod C, and connected by pitman D to pivoted jaw A at a, said lever being provided with a handle, e.

As thus constructed, the implement is adapted to be used as a tobacco-girdler. To convert it into a wrench, levers C and E and pitman D are removed and a short handle, F, is substituted for the rod or handle C.

Handle F may be provided with a fork, n, for drawing nails.

The operation of the device as a girdler is as follows: The lower leaves of the tobacco-stalk having been removed, the instrument is applied to the stalk near the ground, so as to gripe it between the stationary and movable jaws, in contact with serrations m and i. The operator, holding firmly the handles e b, then gives the implement a slight motion from right to left, which causes the serrated jaws to cut the bark of the stalk entirely around. By a reverse motion of the implement the bark is removed from the stalk by the serrations m.

To use the implement as a wrench, parts C, D, and E are removed and handle F substituted, as before described, and the nut to be turned is placed between serrated part m' of jaw B and hook G of jaw A, when by a motion from right to left the jaws will be made to grasp and turn the nut as desired.

I claim as my invention—

The rod C and curved stationary jaw B, having the serrations m m', in combination with the curved forked jaw A pivoted to jaw B, and having serrated portion i, and hook G, the lever E, and pitman D, substantially as described.

GEORGE W. BISHOP.

Witnesses:
SIDNEY F. MARKLEY,
LESTER F. BOULWARE.